United States Patent [19]

Taboga

[11] Patent Number: 5,470,476
[45] Date of Patent: Nov. 28, 1995

[54] METHOD FOR THE TREATMENT OF ANIMAL WASTE

[76] Inventor: Leandro Taboga, Via I. Nievo, 14, I-33010 Coloredo di Monte Albano, Italy

[21] Appl. No.: 113,321

[22] PCT Filed: Mar. 14, 1992

[86] PCT No.: PCT/IT92/00030

§ 371 Date: Jul. 27, 1993

§ 102(e) Date: Jul. 27, 1993

[87] PCT Pub. No.: WO92/16461

PCT Pub. Date: Oct. 1, 1992

[30] Foreign Application Priority Data

Mar. 14, 1991 [IT] Italy .................... UD91A0034

[51] Int. Cl.⁶ .................................... C02F 1/68
[52] U.S. Cl. .............. 210/615; 210/666; 210/667; 210/728; 210/764; 210/916
[58] Field of Search ................... 210/666, 667, 210/668, 660, 749, 758, 764, 723, 728, 916, 615, 631, 632; 71/12, 21, 28

[56] References Cited

U.S. PATENT DOCUMENTS

| 3,377,274 | 4/1968 | Burke et al. | 210/727 |
| 3,718,451 | 2/1973 | Baumann | 71/21 |
| 3,884,804 | 5/1975 | Robinson et al. | 210/916 |
| 4,537,683 | 8/1985 | Isaeoff et al. | 210/667 |

FOREIGN PATENT DOCUMENTS 2321742  3/1973  Germany.

*Primary Examiner*—Christopher Upton
*Attorney, Agent, or Firm*—Palmatier, Sjoquist & Helget

[57] ABSTRACT

A method of animal waste treatment which provides the introduction of a solid material in the animal waste, having the following characteristics; a solid geometric shape, a solid which floats in the animal waste, a solid which is biodegradable, a solid which includes at least resins with formaldehyde and ferrous sulfate.

10 Claims, No Drawings

METHOD FOR THE TREATMENT OF ANIMAL WASTE

TECHNICAL FIELD

My invention relates to a method for the treatment of animal waste.

The treatment carried out with the method concerning this patent is finalized to the neutralization of the free ammonia and also to the partial deodorization of the sewage and lowering of the respective PH to favour the activity of the responsible microbes of the seasoning process of the sewage.

In livestock farms, prior art it is known that the tank for the collection of sewage is realized by a grid floor under the animals.

If this solution provides a lot of advantages, of practicality in use, work and cleanliness of the farm, and also easy conveyance and downflow of the animal excrements through respective and progressive incorporation into the underlying sewage basins separated by said grill, it creates pollution and toxic problems both for the operators and animals obliged to breathe the sewage exhalations.

To obviate said problems aeration systems have been supplied and in particular under grid aspiration systems of the toxic vapors, while the fresh air immission is supplied by under roof openings.

These solutions do not solve however the problem of the pollution of the surrounding atmospheric environment, consequently progressive sewage treatment systems have been experimented, in order to contain the noxious exhalations and to neutralize at maximum the free ammonia and the hydrogen sulphide.

It is known however that the animal waste stored in anaerobic conditions in external basins and et/or under said breeding grid paving, generates ammonia vapors and troublesome odors.

Such drawback and pollution is accentuated when the sewage is spread in rural areas.

The diffusion of ammonia and hydrogen sulphide vapors inside breeding building, in particular in those endowed with said tanks under the animals, causes also stress in the animals with consequent reduction of the animal performance life.

The ammonia present inside breeding buildings, in particular during cold season, makes often necessary a constant and important air exchange by means of forced ventilation with consequent dangerous air current for the animals and high electrical energy costs for further heating.

The relative problems to the ammonia vapors emission and troublesome odors caused in stored zootechnical sewages under anaerobic conditions have been faced in different ways:

use of bacterial mixes and enzymes, use of electrolytic copper dissolution in the sewage (EP 0103345 in the name Huller Wolfgang);

use of electrolytic ions sulfate and phosphate dissolution, coupled with oxidant potassium permanganate (IT 83344A/89 in the name of the same applicant).

The bacterial and/or enzymatic mixes use have high cost and do not allow the attainment of adequate results needed by breeders.

The treatment method based on the electrolytic copper dissolution (P 0103345/IT 83344A/89) in the sewage, give good results only using high electrolytic copper dissolution dosage.

This reduces the usefulness of treated waste since copper causes toxicity and inhibits the action of the bacterial and microbial flora and constitutes a pollution danger for soil and underground water.

The method, object of the Patent Application IT 83344A/89 is too expensive and the benefits have not been so important. Be noted that the electrolytic dissociation of the salts contained in the sewage generates irritating gas.

Both the aforementioned solutions require the installation of a power consumption electric apparatus which is subject to breakdowns during rainstorms by electric discharges.

The innovative idea according to present invention is to provide the gradual diffusion of a reagent liberated from a water insoluble solid body slowly biodegradable without suing electric currents or galvanic systems which are notoriously expensive and dangerous. DE-A-2321742 discloses an aqueous solution containing formaldehyde and ferrous sulfate which is added to zootechnical wastes. Said solution is capable of preventing the formation of odors and will also improve the fertilizing power of the sewages.

This solution is a normal method to deodorize a liquid by dissolving a certain deodorizing product in the animal wastes. This solution does not solve the above raised problem to assure the longterm deodorization of the surrounding air.

The exposed problems are solved as claimed by means of a method for animal sewages treatment of the type in which is provided to introduce in the animal waste, formaldehyde and ferrous sulfate, characterized in that said formaldehyde and ferrous sulfate:

are blocks in solid geometric shape;

are floating in the respective sewage;

are biodegradable;

are incorporated in resins with controlled ion exchange.

Advantageously the resin is of the type urea-formaldehyde or phenol-formaldehyde or melamin-urea-formaldehyde.

The blocks are preferably plate shaped and are reinforced with wood fiber, sawdust, wood chips, acid peat moss, straw or cellulose fragment fibers.

The blocks are insoluble in water but slowly biodegradable and have the property to float on the sewage surface after a few hours from introduction in the waste and remain floating until the complete exchange of the ferrous sulfate contained in them.

The float is determined substantially by the activation of the chemical reaction which generates gas bubbles that reduce substantially the specific weight of the blocks.

The biodegradability of the blocks is an important characteristic avoiding problems of sedimentation.

The gradual diffusion of ferrous sulfate in the superficial stratum of the sewage, supplies a neutralization process of the free ammonia with formation of ammonia-ferro-sulfate Fe (NH4)2 (SO4)2.

This treatment, solves the problems relative to the high costs and the poor reliability of the treatment methods till now used. allows to improve the fertilizing powder of the sewages and supply supplies a good deodorization of the environment.

In commerce there exist fertilizers containing iron, and having the following composition: total Nitrogen 12.5%, iron sulfate 24%; total nitrogen 20%, phosphoric anhydride 5%, potassium oxide 5%, magnesium oxide 2%, iron sulfate 2%.

Conveniently the floating material incorporates tartaric acid and citric acid, to reduce the pH of the waste and favour the activity of the decomposing microbes.

Further advantages are:

possibility to incorporate bacterial and/or enzymatic mixes;

possibility to incorporate disinfectants such as urea formaldehyde;

possibility to neutralize the ammonia contained in the waste alternatively to the air strippage method.

Advantageously:

we use a chemical treatment of the animal wastes by means of diffusion of ferrous sulfate liberated gradually from said block/s made with urea-formaldehyde resin having a molar ratio between 1:1,1 and 1:1,5.

said floating material incorporates potassium permanganate, perphosphate and potassium nitrate.

said floating material incorporates potassium perphosphate.

said floating material incorporates potassium nitrate.

said floating material incorporates organic acids.

said floating material incorporates citric acid.

said floating material incorporates tartaric acid.

said floating material incorporates bacterial mixes.

said floating material incorporates enzymatic mixes.

I claim:

1. A method for animal waste treatment comprising introducing formaldehyde and ferrous sulphate into the animal waste wherein said formaldehyde and ferrous sulphate are incorporated in ion exchange resins which are contained in solid, floating, biodegradable blocks.

2. A method according to claim 1, wherein said resin is urea-formaldehyde.

3. A method according to claim 1, wherein said resin is phenol-formaldehyde.

4. A method according to claim 1, wherein said resin is melamin-urea-formaldehyde.

5. A method according to claim 1, wherein said floating bodies are reinforced with vegetable fibers.

6. Method according to claim 1, wherein said floating bodies are reinforced with wood fiber.

7. A method according to claim 1, wherein said floating bodies are reinforced with wood fiber such as sawdust and wood chips.

8. A method according to claim 1, wherein said floating bodies are reinforced with acid peat moss.

9. A method according to claim 1, wherein said floating bodies are reinforced with cellulosic substances.

10. A method according to claim 1, wherein the ferrous sulphate is liberated gradually from said blocks and said blocks are made with urea-formaldehyde resin having a molar ratio between 1:1.1 and 1:1.5.

* * * * *

UNITED STATES PATENT AND TRADEMARK OFFICE
CERTIFICATE OF CORRECTION

PATENT NO. : 5,470,476
DATED : November 28, 1995
INVENTOR(S) : Leandro Toboga

It is certified that error appears in the above-indentified patent and that said Letters Patent is hereby corrected as shown below:

Column 1, line 44, "building" should be -- buildings --.

Column 2, line 38, delete "of the type".

Column 3, line 28, insert -- said floating material incorporates disinfectant substances and said resin has a formaldehyde ratio between 1:1.1 and 1:1.5 --.

Signed and Sealed this

Thirteenth Day of February, 1996

Attest:

BRUCE LEHMAN

*Attesting Officer*      *Commissioner of Patents and Trademarks*